(12) United States Patent
Hockman

(10) Patent No.: US 9,511,743 B2
(45) Date of Patent: Dec. 6, 2016

(54) METHOD OF DETERMINING IF A VEHICLE HAS BEEN STOLEN AND A SYSTEM THEREFOR

(71) Applicant: Discovery Limited, Sandton (ZA)

(72) Inventor: Yehuda Aryeh Hockman, Johannesburg (ZA)

(73) Assignee: Discovery Limited, Sandton (ZA)

( * ) Notice: Subject to any disclaimer, the term of this patent is extended or adjusted under 35 U.S.C. 154(b) by 0 days.

(21) Appl. No.: 14/415,296

(22) PCT Filed: Jul. 16, 2013

(86) PCT No.: PCT/IB2013/055837
§ 371 (c)(1),
(2) Date: Jan. 16, 2015

(87) PCT Pub. No.: WO2014/013431
PCT Pub. Date: Jan. 23, 2014

(65) Prior Publication Data
US 2015/0203072 A1    Jul. 23, 2015

(30) Foreign Application Priority Data

Jul. 17, 2012    (ZA) .................................. 2012/05316

(51) Int. Cl.
*B60R 25/10*    (2013.01)
*B60R 25/33*    (2013.01)
(Continued)

(52) U.S. Cl.
CPC ............... *B60R 25/10* (2013.01); *B60R 25/32* (2013.01); *B60R 25/33* (2013.01); *G06Q 40/08* (2013.01);
(Continued)

(58) Field of Classification Search
CPC .. B60R 2325/10; B60R 2325/20; B60R 25/10; B60R 25/32; B60R 25/33; G06Q 40/08
(Continued)

(56) References Cited

U.S. PATENT DOCUMENTS 5,548,273 A * 8/1996 Nicol .................... G07C 5/085
                                                            340/438
6,198,996 B1    3/2001 Berstis
(Continued)

FOREIGN PATENT DOCUMENTS

EP            2412588        2/2012
GB    WO 2008050136 A1 *  5/2008    ......... B60R 25/1003
(Continued)

OTHER PUBLICATIONS

International Search Report completed Dec. 23, 2013 for PCT/IB2013/055837 filed Jul. 16, 2013.

*Primary Examiner* — Calvin Cheung
*Assistant Examiner* — Angelina Shudy
(74) *Attorney, Agent, or Firm* — Fleit Gibbons Gutman Bongini & Bianco PL; Paul D. Bianco; Gary S. Winer

(57) ABSTRACT

A system for determining if a vehicle has been stolen includes a communication module to receive data including a location of the vehicle and a manner in which the vehicle is being driven. A comparator module compares the received location data against a database of stored locations and compares the manner in which the vehicle is being driven with previously stored driving data indicating the manner in which the vehicle was historically driven and based on this to determine if the vehicle has been stolen. A notification module issues a notification in response to the comparator module determining that the vehicle has been stolen.

6 Claims, 3 Drawing Sheets

(51) Int. Cl.
  *B60R 25/32* (2013.01)
  *G06Q 40/08* (2012.01)
(52) U.S. Cl.
  CPC ........ *B60R 2325/10* (2013.01); *B60R 2325/20* (2013.01)
(58) Field of Classification Search
  USPC ........................................ 701/31.5
  See application file for complete search history.

(56) References Cited

U.S. PATENT DOCUMENTS

| | | | |
|---|---|---|---|
| 6,526,335 | B1 | 2/2003 | Treyz et al. |
| 7,672,756 | B2 * | 3/2010 | Breed .................... G07C 5/008 |
| | | | 701/1 |
| 2002/0091479 | A1 * | 7/2002 | Maruko ................... B60T 7/22 |
| | | | 701/96 |
| 2004/0201460 | A1 | 10/2004 | Bucholz et al. |
| 2006/0049925 | A1 * | 3/2006 | Hara et al. .................... 340/435 |
| 2007/0208681 | A1 * | 9/2007 | Bucholz .......................... 706/47 |
| 2008/0243558 | A1 | 10/2008 | Gupte |
| 2008/0255722 | A1 * | 10/2008 | McClellan ............ B60R 25/102 |
| | | | 701/31.4 |
| 2012/0109417 | A1 | 5/2012 | Berkobin et al. |
| 2012/0226421 | A1 * | 9/2012 | Kote et al. ....................... 701/51 |
| 2013/0179198 | A1 * | 7/2013 | Bowne ............... G06Q 10/0639 |
| | | | 705/4 |
| 2014/0274016 | A1 * | 9/2014 | Timm et al. .................. 455/418 |
| 2014/0309844 | A1 * | 10/2014 | Breed ................ B60R 21/0132 |
| | | | 701/31.5 |
| 2015/0091713 | A1 * | 4/2015 | Kohlenberg et al. .... 340/426.36 |

FOREIGN PATENT DOCUMENTS

| | | |
|---|---|---|
| WO | 2008/050136 | 5/2008 |
| WO | WO 2008050136 A1 * | 5/2008 |

\* cited by examiner

METHOD OF DETERMINING IF A VEHICLE HAS BEEN STOLEN AND A SYSTEM THEREFOR

BACKGROUND OF THE INVENTION

The present application relates to a method of determining if a vehicle has been stolen and a system therefor.

Many motor vehicles have vehicle tracking systems located therein so that if the vehicle is stolen the tracking system can be activated to recover the vehicle.

These tracking systems require the owner to notify the tracking company that the vehicle has been stolen either by calling into a call centre or pressing a panic button located in the vehicle or on another communications device.

The present invention provides an improved method of determining if a vehicle has been stolen without having to wait for a notification from the vehicle owner and to a system therefor.

SUMMARY OF THE INVENTION

According to one example embodiment, a system for determining if a vehicle has been stolen, the system including:

a communication module to receive data including a location of the vehicle and a manner in which the vehicle is being driven;

a comparator module to compare the received location data against a database of stored locations to determine if the vehicle has entered a previously identified high risk zone, and to compare the manner in which the vehicle is being driven with previously stored driving data indicating the manner in which the vehicle was historically driven, the comparator module determining if the vehicle has been stolen if the vehicle has entered a high risk zone and/or is driven in a different manner to which the vehicle was historically driven; and a notification module to issue a notification in response to the comparator module determining that the vehicle has been stolen.

The manner in which the vehicle is driven may include checking the area in which the vehicle has currently entered which is compared to a previously stored list of areas that the vehicle historically has entered.

The manner in which the vehicle is driven may include comparing at least one of current acceleration, braking, cornering, speed and time of day of travel patterns of the vehicle to previously stored historical patterns.

The manner in which the vehicle is driven may include comparing current g-force patterns of the vehicle to previously stored historical g-force patterns.

According to another example embodiment, a method for determining if a vehicle has been stolen, the method including:

receiving data including a location of the vehicle and a manner in which the vehicle is being driven;

comparing the received location data against a database of stored locations to determine if the vehicle has entered a previously identified high risk zone;

comparing the manner in which the vehicle is being driven with previously stored driving data indicating the manner in which the vehicle was historically driven;

determining if the vehicle has been stolen if the vehicle has entered a high risk zone and/or is driven in a different manner to which the vehicle was historically driven; and issuing a notification in response to the comparator module determining that the vehicle has been stolen.

DESCRIPTION OF EMBODIMENTS

The systems and methodology described herein relate to a method of determining if a vehicle has been stolen and a system therefor.

Referring to the accompanying Figures, an information processing system may include a server 10 that includes a number of modules to implement the present invention and an associated memory 12.

In one example embodiment, the modules described below may be implemented by a machine-readable medium embodying instructions which, when executed by a machine, cause the machine to perform any of the methods described above.

In another example embodiment the modules may be implemented using firmware programmed specifically to execute the method described herein.

It will be appreciated that embodiments of the present invention are not limited to such architecture, and could equally well find application in a distributed, or peer-to-peer, architecture system. Thus the modules illustrated could be located on one or more servers operated by one or more institutions.

It will also be appreciated that in any of these cases the modules form a physical apparatus with physical modules specifically for executing the steps of the method described herein.

Figure 1:
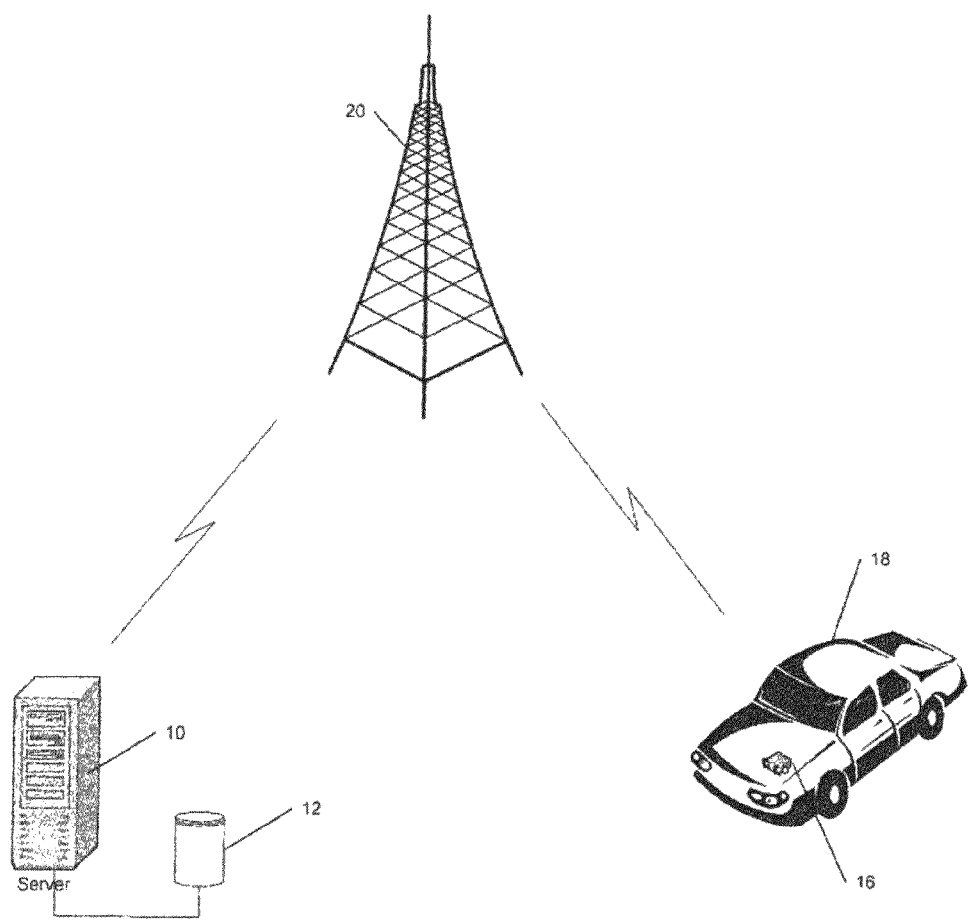
FIG. 1 is an example of an environment in which the system of FIG. 1 operates.
Figure 2:
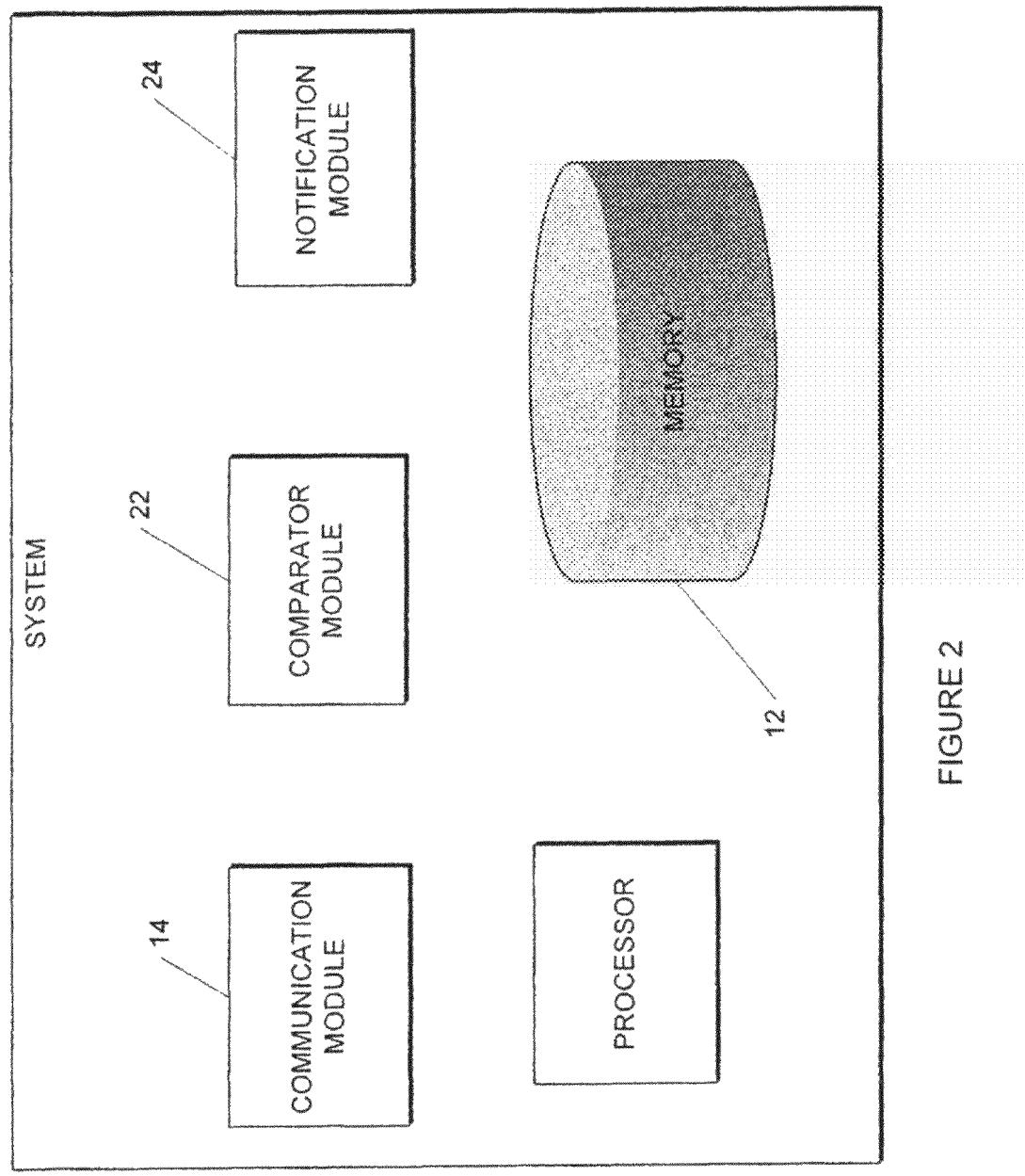
FIG. 2 is a block diagram illustrating an example server in more detail.
Figure 3:
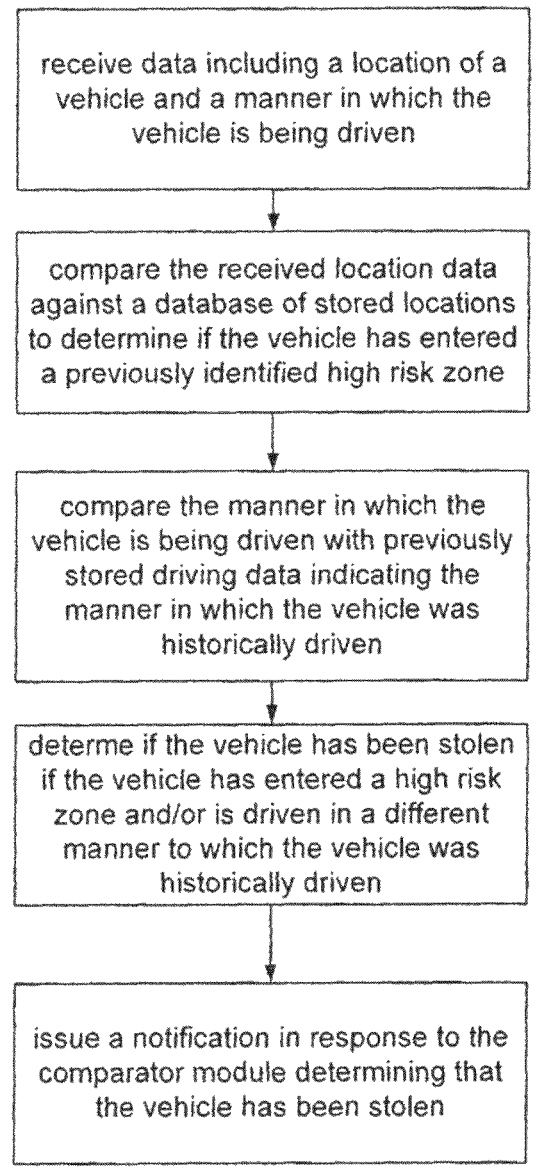
FIG. 3 is a flow chart illustrating the methodology of an example embodiment.

In the illustrated example embodiment, the server 10 includes a communication module 14 (FIG. 2) for receiving data including a location of the vehicle and a manner in which the vehicle is being driven.

In this example embodiment, data is received from a telemetry device 16 associated with a vehicle 18 which is the vehicle of the driver. It will be appreciated that in one example the telemetry device 16 will be installed in the motor vehicle either at the time of production or retro-fitted.

The telemetry device 16 can be used to monitor a number of aspects of the use of the motor vehicle but for purposes of the present example will at least be able to monitor the location of the vehicle and the manner in which the vehicle is being driven. The point of this will be explained below in more detail.

In any event, the data from the device 16 is transmitted to the server 10 over a communication network 20 and received by the communications module 14.

It will be appreciated that this could be accomplished in a number of ways. For example, the data could be transmitted via a communication network 20 as illustrated in the accompanying drawing. This communication network could be any suitable kind of communication network such as a mobile communication network, a wireless communication network, a satellite communication network or a combination of these to name but a few examples.

Alternatively, the device 16 could be connected to another intermediate device which downloads the data and transmits the data via the communication network 20 to the server 10. One example of this could be connecting the device 16 to a USB port of a computer and downloading the data to the computer, which data is then transmitted to the server 10.

In one example embodiment, the data is transmitted over a mobile phone network using the short message service (SMS) protocol.

It will be appreciated that the data could be transmitted at any suitable time to the server. For example, the data could be transmitted in real time or near real time or could be transmitted periodically such as daily, weekly or monthly to name a few examples.

Once the server 10 receives the data it will analyse the data to determine the manner in which the motor vehicle has been driven for a past predetermined period.

A comparator module 22 is used to compare the received location data against a database 12 including stored locations to determine if the vehicle has entered a previously identified high risk zone, and to compare the manner in which the vehicle is being driven with previously stored driving data indicating the manner in which the vehicle was historically driven.

The comparator module 22 determines if the vehicle has been stolen if the vehicle has entered a high risk zone and/or is driven in a different manner to which the vehicle was historically driven.

A notification module 24 issues a notification in response to the comparator module 22 determining that the vehicle has been stolen.

The comparator module 22 compares the manner in which the vehicle is driven by checking the area in which the vehicle has currently entered which is compared to a previously stored list of areas that the vehicle historically has entered.

Alternatively or in addition, the manner in which the vehicle is driven includes comparing at least one of current acceleration, braking, cornering, speed and time of day of travel patterns of the vehicle to previously stored historical patterns and to thereby identify unusual driving events in one of these areas.

Alternatively or in addition, the manner in which the vehicle is driven includes comparing current g-force patterns of the vehicle to previously stored historical g-force patterns.

The methodology in this embodiment includes analysing the g-forces that each driver generally applies to his/her vehicle. For example it may be a common occurrence for driver A to pull off at 0.35G whereas this is an unusual event for driver B. If a g-force has been applied to a vehicle more than 20 times in the past, this is considered a normal occurrence for this particular driver and not something to trigger an alarm (even if objectively the event is unusual). In a proof of concept, 20 events were used as the threshold to determine if an event is an unusual or extreme.

In another embodiment, this will be based on driving time—for example if there are 5 years of driving data available, events will be considered as unusual if they have occurred less than say 100 times.

It is recognised that unusual driving events do occur and a car cannot assumed to be stolen based on the occurrence of an unusual event. For example, it may be very unusual for driver A to brake at −0.4G, nevertheless instances will occur when this driver will need to slam on brakes e.g. a dog runs across the road. However, it is very unusual to have multiple extreme events in a very short space of time. For example, if 3 extreme braking events occur within 1 minute, it more likely that the car was stolen as opposed to a dog running in front of the car 3 times.

For each driver, the extreme events are identified and looked at the number that occurred within a 1, 2, 3, 4 and 5 minute interval. If the system is 99% sure that the occurrence of multiple events is unusual, it is automatically flagged as a theft. If only 95% sure that the occurrence is unusual, the system relies on driver location.

For example, let's consider a particular driver, where historically, if an unusual driving event occurred, in 98% of cases, there was only 1 event within a minute and in 2% of the cases there were 2 unusual driving events within a minute. In such a case if the system sees 3 or more driving events within 1 minute, it would automatically trigger an alarm as the system will have never seen such an unusual occurrence in the past. If only two driving events occur, the system would not trigger an alarm as this has occurred in 2% of cases in the past. However the system may request that the driver be contacted if the vehicle moves out the normal driving location.

One example methodology of implementing the above-mentioned invention is described below.

Once the telematics device 16 is installed in the vehicle 18, the system starts to capture normal driving data which will be used as the historical data referred to above and which provides a reference dataset for the comparator module 22 to use.

This is based on the premise that every person has a unique driving style which can be measured by, for example, analysing the g-forces applied to the vehicle.

When a vehicle is stolen or hijacked, there is usually an extreme change in the way the vehicle is driven. For example, there may be many extreme g-forces applied to the vehicle in a very short space of time.

The comparator module 22 is continually comparing received data with the historical data and when such a change is detected, the vehicle is flagged as a potential theft.

In addition to the above, in some cases, there may be a large change in driving behaviour, however the change is not large enough to be confident that the vehicle has been stolen.

In such cases, the historical area in which the vehicle is usually driven is checked. If the vehicle travels a predetermined distance, for example 1 km, away from the usual areas driven by the vehicle, the vehicle is flagged as a potential theft.

It will be appreciated that in the above methodology, if the manner in which the vehicle is driven it vastly different from the manner in which it has historically been driven then the historical area data need not be checked. If the manner in which the vehicle is driven is different from the manner in which it has historically been driven but not vastly different then the historical area data is checked and used in conjunction. Finally, if the manner in which the vehicle is driven is substantially the same as the manner in which it has historically been driven then the historical area data is also not used unless the vehicle enters a predefined high risk zone as described below.

Certain areas have been identified as "cool off zones" where thieves often take vehicles after they have been stolen. If a vehicle enters one of these zones regardless of driving style, the vehicle will be flagged as a potential theft and the driver contacted.

In the above scenarios, if the vehicle is flagged as a potential theft, the notification module 24 notifies either an individual in the tracking company or a nominated driver of the vehicle or both.

Trials of the system have been able to identify 90% of stolen vehicles without the need for the driver to report the vehicle stolen.

The invention claimed is:

1. A system for determining if a vehicle has been stolen, the system including:
   a telematics system mounted in the vehicle;
   one or more electronic processors connected to execute software stored on computer readable storage medium to:
      periodically receive data including current acceleration and braking data, from the telematics system;
      continually compare the current acceleration and braking data with previously stored historical acceleration and braking data for the vehicle, and when the G-forces associated with at least one of current acceleration and braking data differ to a predetermined extent from the previously stored historical acceleration and braking data for the vehicle, electronically transmit a theft notification,
   wherein:
      when continually comparing, the previously stored historical data includes a definition of a G force corresponding to an unusual driving event as G-forces associated with at least one of acceleration and braking data exceeding a predetermined amount which have occurred less than a first predetermined number of times during a first predetermined period, and the G-force associated with the current braking and acceleration data includes a determined number of times that the G-forces correspond to the defined unusual driving events during a second predetermined period; and
      the notification issued when the determined number of times is greater than a second predetermined amount during the second predetermined period.

2. The system according to claim 1 wherein in addition to receiving current acceleration and braking data, the telematics system provides cornering, speed, and time of day of travel of the vehicle data which the electronic processor compares together with the braking and acceleration data with respect to previously stored historical data for cornering, speed, and time of day of travel of the vehicle, in order to determine that the notification should be electronically transmitted.

3. The system according to claim 1 wherein the electronic processor uses location data provided by the telematics system to determine that the vehicle has entered a previously identified geographical zone correlated with vehicle theft and to thereupon electronically transmit a theft notification.

4. A method for determining that a vehicle may have been stolen, the method including:
   receiving data by an electronic processor from a vehicle telematics system of the vehicle, the data including G forces measured in the vehicle during a first predetermined period;
   defining a G force corresponding to an unusual driving event as G forces exceeding a predetermined amount which have occurred less than a first predetermined number of times during the first predetermined period;
   receiving data by an electronic processor from a vehicle telematics system of the vehicle, the data including a current location of the vehicle and current G forces measured in the vehicle;
   using the electronic processor to determine a number of times that the current G forces correspond to the defined unusual driving events during a second predetermined period, and where the number of times is greater than a second predetermined amount during the second predetermined period, issue a theft notification; and
   compare the received current location data against a database of stored locations of the vehicle, and where the current location of the vehicle is more than a predetermined distance away from any stored location of the vehicle, issue a theft notification.

5. The method according to claim 4 wherein the current G-force is derived from acceleration, braking, and cornering.

6. The method according to claim 4 wherein the vehicle is determined as may have been stolen if the current location of the vehicle is determined to be in a previously identified high risk geographical zone with respect to vehicle theft.

* * * * *